Figure 1:
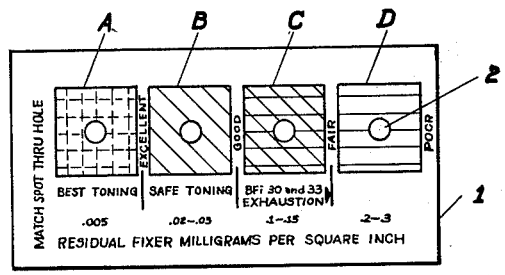

March 19, 1957   J. B. COPENHEFER ET AL   2,785,958
METHOD FOR QUANTITATIVELY TESTING FOR THIOSULFATE RADICAL
Filed Nov. 24, 1953

INVENTOR.
JOHN B. COPENHEFER
and HENRY L. SCOTT
BY
ATTORNEY

United States Patent Office 2,785,958
Patented Mar. 19, 1957

2,785,958

METHOD FOR QUANTITATIVELY TESTING FOR THIOSULFATE RADICAL

John B. Copenhefer, Louisville, and Henry L. Scott, Buechel, Ky., assignors to Brown-Forman Distillers Corporation, Louisville, Ky., a corporation of Delaware Application November 24, 1953, Serial No. 394,046

6 Claims. (Cl. 23—230)

The present invention relates to a method of testing for the presence of the thiosulfate radical, and relates in particular to a method of testing for residual thiosulfate or hypo in developed photographic silver emulsion films, or prints.

All photographic fixers in current use contain the thiosulfate radical, either as the ammonium or sodium salt, and it is necessary to remove thiosulfate from the developed print or film to insure permanence of the photograph. The standard test now employed for testing for residual thiosulfate in silver emulsions, known as the Crabtree-Ross test, involves a relatively complicated procedure and readings of the results by a densitometer. Such tests require a considerable amount of time, trained operators and special expensive apparatus so that the test is relatively expensive and inconvenient. Furthermore, as the presence of ammonium interferes with this test, difficulty is experienced where ammonium thiosulfate has been used as the fixer.

It is an object of the present invention to provide a rapid test for the presence of thiosulfate radical in developed silver emulsions which is relatively simple and easy to carry out, so that the test may be performed by the average amateur or professional photographer.

A further object of the invention is to provide a simple, rapid, inexpensive test to determine uniformity of removal of thiosulfate radical from developed silver emulsions.

Another object is the provision of a simple, rapid, inexpensive test to determine the condition of a developed print for toning relative to residual thiosulfate radical.

Another object is the provision of a simple, rapid, inexpensive test for determining the degree of exhaustion of a bath for removing thiosulfate compounds from developed film or prints.

Another object is the provision of a simple, rapid, inexpensive test for determining the presence of the sum of the thionates and tetrathionates in developed film or prints.

Another object is the provision of a rapid, simple test for the presence of the thiosulfate radical in developed emulsions which is applicable to ammonium or sodium thiosulfate.

Still another object is the provision of a simple, rapid, inexpensive test to determine the time required for washing out residual fixers from silver emulsion prints and films.

The present invention is based upon our discovery that under certain conditions the color produced in a silver emulsion when an acidified aqueous solution of ferric ammonium citrate and potassium ferricyanide is applied thereto, is a quantitative function of the amount of thiosulfate radical in the emulsion. By controlling all factors except the concentration of thiosulfate radical, the color produced becomes a quantitative indication of the thiosulfate radical, and a comparison of the color produced in the test against a standard may be employed to measure the concentration of thiosulfate radical in the emulsion. The comparison may be made by means of a densitometer, but preferably is made against a color chart. The solution of potassium ferricyanide and ferric ammonium citrate is particularly suitable for visual comparison against a color chart because the colors produced are a mixture of yellow and blue in which the proportions of these colors vary in accordance with the amount of thiosulfate radical available for the reaction. By suitably selecting the conditions of the test, the colors produced may be confined to those mixtures of yellow and blue which are easily visually distinguishable, so the test may be conducted by the average amateur or professional photographer or developing machine operator.

The test color becomes fixed or mordanted to the silver particles in the emulsion, and the color density produced in the emulsion varies with the density or concentration of the silver particles. Other factors which affect the color produced are: the concentration of the thiosulfate radical in the emulsion, the ratio of potassium ferricyanide to ferric ammonium citrate in the test solution; the time of contact of the test solution with the emulsion; and the formation of a precipitate on the surface of the emulsion. The test solution is not sensitive to organic matter or other impurities usually found in wash water, and the presence of chromium or aluminum compounds sometimes present in such emulsions does not affect the color. The test is applicable whether ammonium or sodium thiosulfate has been employed as the fixer. The color is also varied by the presence of tetrathionates, but if the fixing operation is properly carried out, tetrathionates are not present in the emulsion. However, when the test is conducted under conditions where the concentration of the thiosulfate radical is known to be low, an excessive blue color reaction indicates the presence of tetrathionates and thus indicates a fault in the fixing step.

Although the silver density varies in the exposed portions of developed prints or films, in the unexposed or white margin of prints and the unexposed clear margin of films, the silver density is substantially constant. By applying the test solution or indicator to such white or clear areas, the effect of silver density is controlled so as to be substantially constant. Complete absence of thiosulfate radical in the film or print produces a light greenish yellow color. Any thiosulfate radical present reacts with the indicator solution to form a deep blue color that is mordanted to the silver particles, and which varies in intensity with the amount of thiosulfate radical available for the reaction, so that the color produced by the test is a mixture of yellow and blue.

For testing for residual thiosulfate radical, a drop of the test solution or indicator is applied to the developed print or film on the emulsion side in an unexposed area, allowed to stand for a predetermined time, then is wiped off, and the color of the test spot is compared with the colors of the color chart. Wiping is necessary to remove excess of the colored test solution, and also to remove any precipitate that may have formed on the surface of the emulsion, which if not removed, would obscure the true color and thus produce a false indication. The depth of blue color produced by the thiosulfate radical in the test increases with the time the test solution is allowed to remain in contact with the emulsion, so that to obtain a color indication accurately indicative of the thiosulfate concentration, the time between application of the test solution and wiping should be predetermined. Because the color produced is affected by light, readings or comparisons made after about one half hour are no longer an accurate indication of thiosulfate concentration.

The color produced in the test is also a function of the ratio of potassium ferricyanide to ferric ammonium citrate in the test solution. By increasing this ratio the color of the test in the presence of a given concentration of thiosulfate radical becomes more blue, and by decreasing this ratio the color produced is shifted toward yellow. To enable unskilled operators to easily distinguish color differences in the test we prefer to select the ratio of potassium ferricyanide to ferric ammonium citrate in the indicator solution and the time before wiping, so that the operative color range encountered is in the yellow to green range. This may be accomplished by a ratio of equal parts by weight of potassium ferricyanide to ferric ammonium citrate and a test time of two minutes. As the ratio approaches 2:1, or approaches 1:2, or as the time exceeds five minutes it becomes increasingly difficult to visually distinguish small variations in the color produced in the test, although the color variations can be distinguished on a densitometer.

Standards for thiosulfate concentration in prints and film have been established by the American Standards Association as follows, and the corresponding colors may be used on a color chart.

Maximum:
    .005 mg./sq. in_____ For archival storage (50 years and over).
    .02 mg./sq. in_____ For 25 years storage.

In addition the chart may include colors corresponding to the following standards:

.1 to .15 mg./sq. in_____ Suitable for commercial operation. Not suitable for toning.
.2 to .3 mg./sq. in_____ Unsafe.

Using a ratio of equal weights of potassium ferricyanide and ferric ammonium citrate in the test solution, and a time of two minutes before wiping, a concentration of thiosulfate radical up to .02 mg./sq. in. produces a yellow green; a concentration of thiosulfate radical up to .15 mg./sq. in. produces a bluish green, readily distinguishable from the yellow green; and a concentration above .2 mg./sq. in. produces a greenish blue easily distinguishable from the bluish green. These conditions also permit establishing a standard where a concentration up to .005 mg./sq. in. produces a yellow green readily distinguishable from the color produced by .02 mg./sq. in. concentration. For use as a practical aid to commercial photographers and developers a chart showing colors corresponding to these maximal limits is satisfactory. For more accurate analytical work a color chart with a larger number of color patches corresponding to a larger number of thiosulfate radical concentration may be employed or densitometer readings may be taken and compared to preestablished standards.

An inexpensive type of color chart may be employed which carries patches of permanent color corresponding to the color produced by known concentrations of thiosulfate radical. Such color patches may be produced by printing the patches on glazed paper with permanent printing inks carefully compounded to match the color produced by the indicator with known concentrations of thiosulfate radical. The above colors may be reproduced on a glossy white paper color chart by printing with an ink containing mixtures of Primrose Yellow, Munsell No. Z-W25, Peacock Blue NY, Munsell No. 29,647, Cenal Orange, IPI color 210, reduced with offset tint base to accurately match the colors of the spot test on photographic printing paper. It will be appreciated that the skilled color matcher will be able to select the colors required to print the color patches on the chart.

In practice, the test is carried out on prints or films which have passed through the various steps of developing, fixing and washing in known manner. The indicator or test solution may be applied to the white margin of prints, or the clear margin of films, or if desired, an unexposed blank may be passed through the various operations along with the film or prints, and treated with the test solution. The print or film may be wet or dry at the time of testing. The test is equally applicable to old prints or films.

Figure 2:
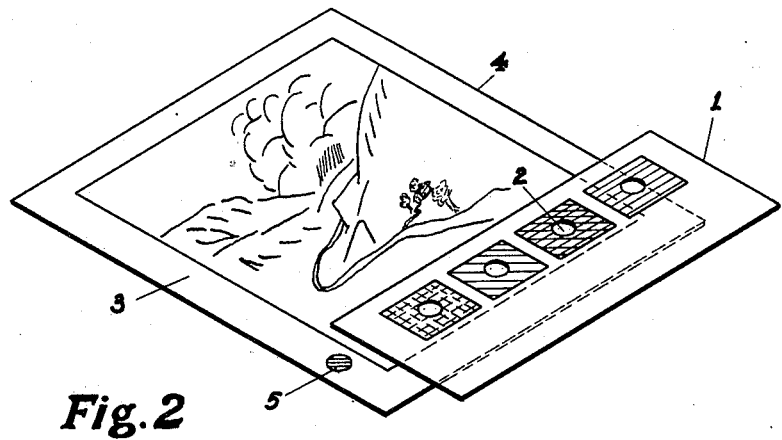

In the accompanying drawing illustrating a preferred type of color chart suitable for use by commercial or amateur photographers, Figure 1 illustrates a color chart with the preferred indicia thereon, and Figure 2 illustrates one manner of using the color chart.

Referring to the drawing, 1 represents a stiff glazed paper support upon which is printed four color patches A, B, C and D. The lining of these patches show patch A is a greenish yellow; patch B is green; patch C is green with a greater blue content; and patch D is blue. Holes 2 may be punched through the color patches. In conducting the test a drop of the indicator solution is applied to the clear margin 3 of the photograph 4, and after wiping off the liquid, a spot 5 remains on the photograph, here shown as a blue spot. The chart is now placed over the photograph with the test spot 5 showing through a hole 2, and the color is compared with the patch surrounding the hole. Each patch may be so compared until the closest matching patch is selected, and the legend applicable thereto, namely, excellent, good, fair or poor shows the extent to which the hypo has been washed from the photograph. The chart also shows the concentration ranges of fixer for each color patch, and the color patches indicate whether the photograph contains too much hypo for good toning, and also indicates exhaustion of the hypo neutralizer where neutralizer is used.

EXAMPLE

A testing solution is prepared by mixing together the following ingredients:

| | | |
|---|---|---|
| demineralized water | 44 gallons | |
| ferric ammonium citrate | 4,400 grams | photographic grade scales. |
| potassium ferricyanide | 4,400 grams | photographic grade. |
| glacial acetic acid | 40 liters | |

After mixing, enough demineralized water is added to make one hundred gallons. This produces a substantially saturated solution. Weaker solutions may be employed if desired. It will be understood that other acids may be employed in the indicator, such solutions being known to the art for other uses. The indicator solution may be stored in brown glass bottles to protect it from deterioration by light.

The following is the preferred testing procedure applied to photographic prints: The print is developed and fixed in the usual manner and after being washed, excess water is wiped or blotted from the print. The test solution is shaken to suspend any precipitate, and a drop of the test solution is applied to the emulsion face of the print on the white margin. This drop is left in contact with the print for two minutes (timed on a watch) and then is wiped off with a clean damp cloth, being sure to remove any colored deposit on the surface. The color of the spot then is compared with the color chart by holding the test spot under a hole in the chart and moving the chart from one hole to another until the closest color match is established between the test spot and the color surrounding the hole. The legend on the chart then gives the concentration of thiosulfate radical or other appropriate data. This comparison should be made by daylight or under fluorescent light, as the usual incandescent light emits enough yellow light to mask some of the yellow in the test color. The distinction and comparisons can even be made by color blind persons because of the variations in density of color.

In a similar way film is tested for thiosulfate content. In making the comparison on film it is generally preferable to place the film on the chart and bring the test spot into close proximity with the chart colors. Although the chart colors appear darker when viewed through the film, the effect applies to all the chart colors and can be allowed for. On clear film this shading of color is not encountered.

The test may be applied to dry prints or film, and may be employed on old prints or film.

Exhaustion of hypo eliminator bath

Where a hypo removing solution is employed in the wash water after fixing, for example, as described and claimed in the application of Henry L. Scott, et al. Serial No. 321,738 filed November 20, 1952 and now Patent 2,688,546, for composition for Treating Photographic Film to Eliminate Hypo, the indicator solution and chart may be employed to show when the hypo removing solution is exhausted. Exhaustion of this solution is determined when the spot test shows correspondence to patch C, after previous tests have shown correspondence to patches A or B.

Toning

The indicator also may be used as a pre-toning test. A test color corresponding to patch A is satisfactory for best toning results. Test color corresponding to patch B shows suitability for toning, although the color will be bluer and less uniform.

Uniformity of washing

The spot test may be made on various locations on a print to determine whether removal of hypo is uniform. Nonuniformity may be due to prints sticking together in the washing tank, or may be caused by insufficient agitation.

Test for over fixing

Excessive time in the fixer causes the formation of insoluble tetrathionates and other complex compounds, which break down on ageing to cause yellowing and loss of contrast. Such compounds are not sufficiently removed in the ordinary washing operation. When a test blank that has been washed under conditions which have reduced the thiosulfate to correspond to good practice, nevertheless shows a color reaction more blue than expected, this is due to over fixing or an exhausted fixer bath. Fixing time may be determined by testing sample prints exposed to the fixing bath for various times, or by other known methods.

Determining washer capacity

Uniformity of thiosulfate removal may be determined by making a streak of the test solution across the length and width of a blank, wiping off the streak after a predetermined time, and observing for uniformity or nonuniformity of color in the streak. A nonuniform streak indicates crowding in the washer that results in nonuniform removal of thiosulfate from the emulsion. If this occurs, the number of prints washed at one time in the tank should be reduced, and the test repeated to check for uniformity of washing. Prints sticking together in the washer or insufficient agitation in the washer also may cause uneven removal of thiosulfate.

Test for washing efficiency

Efficiency of washing may be determined by spot testing the uncut margin of a print or an unexposed blank removed from the washer. The test is rapid, and if it shows insufficient washing the print may be returned to the washer for further washing. Testing in this way may be carried out at intervals till the proper washing time has been established. Thereafter only occasional testing is required.

We claim as our invention:

1. The method of testing a developed photographic silver emulsion for the presence of thiosulfate radical which comprises: applying a limited quantity of an acidified solution of potassium ferricyanide and ferric ammonium citrate to a limited area of the emulsion to be tested; wiping off supernatant solution after a predetermined time; and comparing the color produced in the emulsion to a predetermined standard to determine the concentration of thiosulfate radical in the emulsion.

2. The method as specified in claim 1 wherein: the predetermined standard comprises a color chart having patches of color corresponding to predetermined concentrations of thiosulfate radical.

3. The method as specified in claim 1 wherein: said acidified solution is applied as a drop to an unexposed area of the emulsion to be tested.

4. The method of testing for uniformity of thiosulfate radical concentration in a developed photographic silver emulsion which comprises: applying an indicator solution of acidified potassium ferricyanide and ferric ammonium acetate to various areas of the emulsion having substantially equal silver grain density; wiping off supernatant solution after a predetermined time, and comparing the colors produced by the indicator in the various areas.

5. The method as specified in claim 1 wherein the ratio of potassium ferricyanide to ferric ammonium citrate is within the range of 2:1 to 1:2 on a weight basis.

6. The method as specified in claim 1 wherein the ratio of ferricyanide to ferric ammonium citrate is substantially 1:1 on a weight basis.

References Cited in the file of this patent

UNITED STATES PATENTS

| | | |
|---|---|---|
| 1,597,830 | Rueger | Aug. 31, 1926 |
| 1,741,080 | Stenz | Dec. 24, 1929 |
| 2,231,201 | Snyder | Feb. 11, 1941 |
| 2,370,683 | Palma | Mar. 6, 1945 |